(12) United States Patent
Delobel et al.

(10) Patent No.: US 8,210,809 B2
(45) Date of Patent: Jul. 3, 2012

(54) SYSTEM FOR CONNECTING TWO SUBSTANTIALLY TUBULAR MEMBERS, A CASE COMPRISING SUCH A SYSTEM AND USE THEREOF

(75) Inventors: Pierre Joseph Marie Christophe Delobel, Angleur (BE); Andre Lucien Jacques Lhoest, Huy (BE)

(73) Assignee: Techspace Aero, Milmort Herstal (BE)

( * ) Notice: Subject to any disclaimer, the term of this patent is extended or adjusted under 35 U.S.C. 154(b) by 1201 days.

(21) Appl. No.: 11/964,184

(22) Filed: Dec. 26, 2007

(65) Prior Publication Data

US 2008/0159858 A1   Jul. 3, 2008

(30) Foreign Application Priority Data

Dec. 27, 2006 (FR) .................................. 06 127256

(51) Int. Cl.
*F01D 25/24* (2006.01)
(52) U.S. Cl. ................................................ 415/214.1
(58) Field of Classification Search ............. 415/134, 415/199.1, 199.2, 199.4, 199.5, 213.1, 214.1
See application file for complete search history.

(56) References Cited

U.S. PATENT DOCUMENTS

| | | | | |
|---|---|---|---|---|
| 2,466,602 | A | * | 4/1949 | Lombard et al. .............. 285/261 |
| 2,940,692 | A | * | 6/1960 | Ward et al. ....................... 244/15 |
| 4,951,973 | A | * | 8/1990 | Corsmeier ....................... 285/24 |
| 7,121,789 | B2 | * | 10/2006 | Richards .................... 415/173.1 |
| 2005/0118020 | A1 | * | 6/2005 | Kirk ............................. 415/214.1 |
| 2006/0193721 | A1 | | 8/2006 | Adam et al. |

FOREIGN PATENT DOCUMENTS

| | | |
|---|---|---|
| EP | 0 590 310 A1 | 4/1994 |
| EP | 1 158 142 A2 | 11/2001 |
| EP | 1 505 259 A1 | 2/2005 |
| EP | 1 698 761 A2 | 9/2006 |
| GB | 2 384 829 A | 8/2003 |

OTHER PUBLICATIONS

U.S. Appl. No. 11/964,380, filed Dec. 26, 2007, Lhoest.

* cited by examiner

*Primary Examiner* — Nathaniel Wiehe
(74) *Attorney, Agent, or Firm* — Oblon, Spivak, McClelland, Maier & Neustadt, L.L.P.

(57) ABSTRACT

A system for connecting two substantially tubular members, particularly ferrules of an axial compressor case, is disclosed. The system includes two flanges, where each flange has a proximal face and a distal face; securing members for clamping distal faces one against the other having a junction latch adapted to be housed into at least one cavity; and at least one collar having two side faces provided so as to abut against the flange proximal faces.

20 Claims, 2 Drawing Sheets

BACKGROUND ART

SYSTEM FOR CONNECTING TWO SUBSTANTIALLY TUBULAR MEMBERS, A CASE COMPRISING SUCH A SYSTEM AND USE THEREOF

BACKGROUND OF THE INVENTION

1. Field of the Invention

The present invention relates to a system for connecting two substantially tubular members, more particularly two ferrules of an axial compressor case.

2. Description of the Related Art

Axial compressors, for example, in turbojets, are generally made with an axial sequence of rotors and stators. Each rotor is a set of rotary blades secured to the driving shaft of the compressor. Each stator is a set of stationary rectifying vanes secured to the compressor case. Each rotor is followed by a stator, so as to form a compressor stage.

A turbojet can comprise a plurality of successive compressors, for example, a low pressure compressor mounted in front of a high pressure compressor, where each comprises a different driving shaft.

Generally, an axial compressor case is formed with a set of substantially tubular members, also called ferrules, being successively connected. Each ferrule generally surrounds a compressor stage, i.e. a rotor and a stator. A ferrule will thus normally comprise the set of stationary vanes forming the stator, or means for securing said stationary vanes, as well as an abradable inner surface so as to avoid an excessive friction with the rotor blades.

The pairs of successive ferrules are connected via connecting systems comprising:

a) two flanges, each being substantially annular and comprising a proximal face adapted to be integral with one of the two successive ferrules and a distal face, and b) securing members for clamping the distal faces of the two flanges one against the other, so as to be able to transmit tensile and compression axial stresses between both flanges assembled through clamping.

As used herein, distal face means the most remote face of the ferrule body, whereas proximal face means the nearest one of the ferrule body. In the state of the art, there are used as securing members bolts crossing holes arranged in the flanges. However, such an arrangement has several inconveniences.

Should one of the compressor blades or vanes breaks, significant circumferential stresses will become added to the axial and radial stresses between the pairs of adjacent ferrules. Such stresses have a shearing effect on the bolts of the connecting system, requiring the use of a great number of bolts of a considerable diameter for securing ferrules. With the aim to solve the problem of the too numerous bolts, it is necessary to oversize the flanges by increasing the external diameter.

In addition to the cost and weight inconveniences resulting from such an oversizing, the radial bulk of enlarged flanges also shows other problems. So, in many applications, such bulk makes the assembling and disassembling operations difficult, because of interferences between flanges and members outside the compressor, such as, for example, hoods. More particularly, in the field of turbojets, it could be desirable to be able to disassemble the low pressure compressor at the rear in order to make the maintenance easier. However, if the connecting flanges for the ferrules of the low pressure compressor case are too bulky, they will abut against the intermediate case generally located at the back of the low pressure compressor and used for supporting the whole turbojet.

BRIEF SUMMARY OF THE INVENTION

According to this invention, the object is to overcome the inconveniences of the state of the art, providing a system for connecting tubular members allowing to minimize the radial bulk of such a system, more particularly in the case of ferrules for an axial compressor case.

In order to overcome such a problem, this invention provides a system for connecting two substantially tubular members, in particular ferrules for an axial compressor case, as indicated in the opening paragraph, characterized in that said securing members comprise at least one junction latch able to be housed in at least one cavity formed by said both assembled flanges, each cavity and each latch having an at least partially complementary shape, each latch having projections provided with securing means and at least one collar having two side faces arranged so as to abut on the proximal faces of both assembled flanges, and comprising further securing means for said securing means of said projections of said at least one junction latch.

Thereby, the flanges, being positively connected by the latch and covered with one or more collars, at regular intervals, or not, allow the use of several clamping points for reducing the friction influence during the clamping operation. The bulk of securing elements is reduced, allowing to significantly reduce the flange external diameter. Consequently, the securing members can be quantitatively less numerous than the bolts as used in the prior art, allowing to save time for disassembling and assembling the cases. The contact pressure between the flanges is optimally distributed, reducing the risks of breaking the flange securing members. The weight and the cost are thus also reduced.

Advantageously, said latch comprises two distinct and preferably, separated parts, each of both parts comprising at least one, preferably, two of said projections provided with said securing means. This allows to limit the weight of the connecting system.

In a particularly advantageous aspect, the connecting system comprises a plurality of latches, a plurality of collars and the assembled flanges comprise or form a plurality of cavities. Thereby, the securing means allow to increase the flange securing resistance.

Indeed, whereas in a system comprising one single connecting collar, should a junction point break, that is the whole flange junction that is jeopardised, since with a single junction point being broken, the connecting system is opened and the flanges are no longer assembled. By means of the connecting system according to this invention, breaking a securing member will not result in the flanges being disassembled as the securing members are segmented. Similarly, through using segments, circumferential torsion stresses are transmitted on both sides of the flange to the latter, as the prestresses on the circumference are made homogeneous. Similarly, using segments makes it possible to distribute frictions during clamping of the segments (collars), and thus allows to obtain a better distribution of the prestress efforts through a progressive clamping of the securing means.

In a particular embodiment, each cavity and each latch comprise a first, a second and a third face, said first face of each cavity and of each latch being substantially parallel to the circumference of each of said flanges and mutually complementary, said second and third faces of each cavity extending from and forming an angle $\alpha$ with the first face of each cavity, the second face and the third face of each latch being respectively provided so as to be in tight contact with the second face and the third face of each cavity.

Thereby, each latch is positively connected with the flanges and ensures both a radial retention as well as a circumferential retention of the assembled flanges. Advantageously, the angle α is within a range varying from 15° to 90°, preferably, from 30° to 60°. Such values increase the retention effect of each latch.

Preferably, each latch and the assembled flanges have an identical width, allowing for an optimal distribution of strains.

In a particularly advantageous embodiment, the proximal face and the distal face of each of both flanges are tilted one with respect to the other by an angle β, the distal face of each flange being perpendicular to a longitudinal axis of said tubular member, and wherein the side faces of said collar are also tilted one with respect to the other by an angle γ lower than 2×β.

The flange flanks (proximal faces) are substantially tapered through the tilting between the proximal face and the distal face of the flanges by an angle β (the distal face being perpendicular to the longitudinal axis of the tubular member) for obtaining an axial prestress effort ensuring an adequate transmission of the stresses into the assembly. The angle γ being lower than 2×β, the collar should be distorted for overlapping the assembled flanges and therefore, the memory of the collar-forming material as well as the distortion force improve the contact between flanges. This will reduce the possibility of a loss of part of the prestress efforts that could result in a flange sliding and therefore, in the assembly integrity being damaged.

The control of the prestress could be achieved through measuring the clamping torque of the securing means, possibly completed through the measurement of the segment distortion, in spotted areas and the finish of which should allow for an accurate measurement. The geometry should allow for a distribution of the stresses in the various parts of the assembly, including in the flange connection with the ferrules. The clamping stress between flanges is distributed throughout the contact surface between the latter and the segments. Important local strains occurring in the case of conventional flanges of the prior art are therefore avoided, (under the screw and bolt heads).

Advantageously, said latch is a solid prism with a trapezoidal section. This reinforces the power of the assembly and improves the distribution of the stresses in the assembly.

Preferably, the securing means for the projections of said junction latch comprise a hole into which a stem is inserted, more particularly a threaded stem, and in which securing means for said collar also comprise projections provided with holes into which said threaded stem is inserted. This allows to implement a progressive and gradual clamping. Particularly, point or skirt nuts will be inserted into threaded stems.

With the aim of further improving the distribution of stresses in the assembly, each collar is arranged so as to partially overlap each latch when the projection-securing means of said latch are connected with said securing means for said collar.

Other embodiments of the connecting system according to this invention are indicated in the appended claims.

The present invention also relates to an axial compressor case, for example, a low pressure compressor of a turbojet or a turboprop, comprising a plurality of ferrules, at least two of which are adjacent and connected by a connecting system according to this invention.

Advantageously, at least one of said two adjacent ferrules comprises a stator and/or an abradable inner surface.

Other embodiments of the case according to this invention are indicated in the appended claims.

Moreover, the present invention relates to the use of a connecting system for connecting at least two adjacent ferrules of an axial compressor case, for example, of a low pressure compressor of a turbojet or a turboprop, particularly, at least one of said two adjacent ferrules comprises a stator and/or an abradable inner surface.

Other embodiments of the use according to this invention are indicated in the appended claims.

BRIEF DESCRIPTION OF THE DRAWINGS

Other features, details and advantages of this invention will become more apparent from the description as set forth herein under, and referring to the appended drawings.

DETAILED DESCRIPTION OF THE INVENTION

On figures, identical or analogous elements are referred to using the same numerals.

Figure 1:
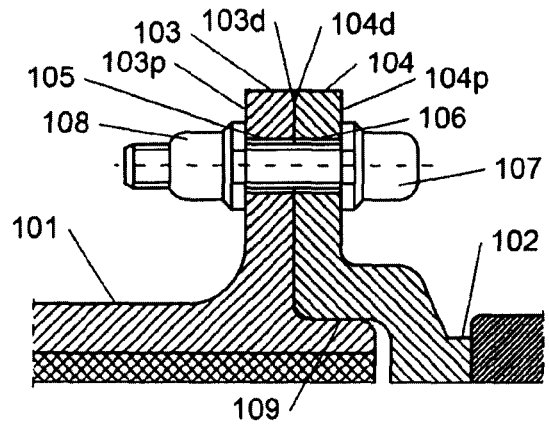
FIG. 1 is a sectional view of a connecting system of the state of the art.

As could be seen in FIG. 1, in the state of the art, each of the ferrules 101 and 102 of a low pressure compressor case of a double flow turbojet comprises a flange, respectively designated by 103 and 104. Each of such flanges 103, 104 has a proximal face, respectively designated by 103p and 104p, and a distal face, respectively designated by 103d and 104d. In each flange, 103, 104, a set of holes, respectively designated by 105 and 106, connect the proximal face 103p, 104p with the distal face 103d, 104d. The holes 105 of the flange 103 are aligned with the holes 106 of the flange 104, so as to be able to have screws 107 pass therethrough. Clamping such screws 107 with nuts 108, it is therefore possible to achieve an axial connection between ferrules 101 and 102.

While the transmission of radial stresses is ensured by the interlocking of centering surfaces 109 of ferrules 101, 102, bolts 107 should ensure, in addition to the axial traction, the circumferential torsion between flanges 103, 104. Such a torsion submits bolts 107 to shear stresses, requiring their working section to be increased, and therefore the diameter of the holes 105, 106 and the height of flanges 103, 104.

Figure 2:
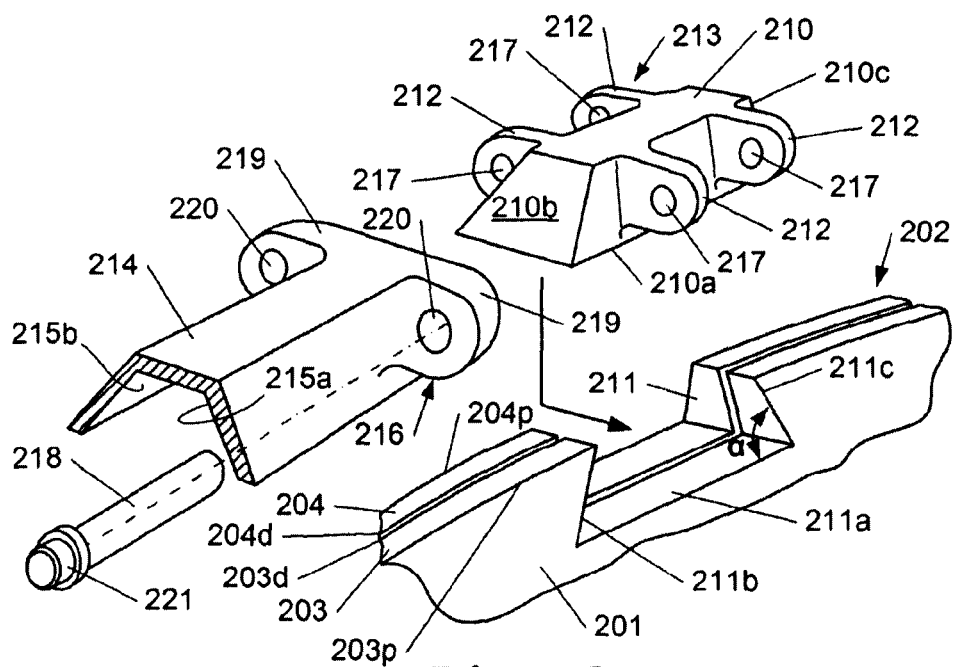
FIG. 2 is a perspective view of the connecting system according this invention.

FIG. 2 illustrates the connecting system according to this invention. As can be observed, the connecting system according to this invention makes it possible to clamp together two ferrules 201, 202 of an axial compressor case, for example, a low pressure compressor case of a double flow turbojet.

As previously stated, the connecting system according to this invention allows to connect two ferrules 201, 202 by means of two substantially annular flanges 203, 204. Each flange 203, 204 comprises a proximal face 203p, 204p and a distal face 203d, 204d.

The connecting system comprises securing members for clamping the distal faces 203d, 204d of both flanges one against the other. The securing members make it possible to transmit tensile and compression axial stresses between both flanges assembled through clamping. Securing members comprise at least one junction latch 210 provided for being housed in at least one cavity 211 formed by said both assembled flanges 203, 204. As can be easily seen, each cavity 211 and each latch 210 has a shape at least partially complementary. Indeed, each cavity 211 having a shape complementary to that of a latch 210 and each latch 210 both comprise a first 210a, 211a, a second 210b, 211b and a third face 210c, 211c.

Obviously, the shapes of the cavities 211 could be different one from the other within the same connecting system, provided each cavity 211 comprises its junction latch 210 with a shape complementary to that shape of the cavity 211 into which it is to be housed.

Figure 3:
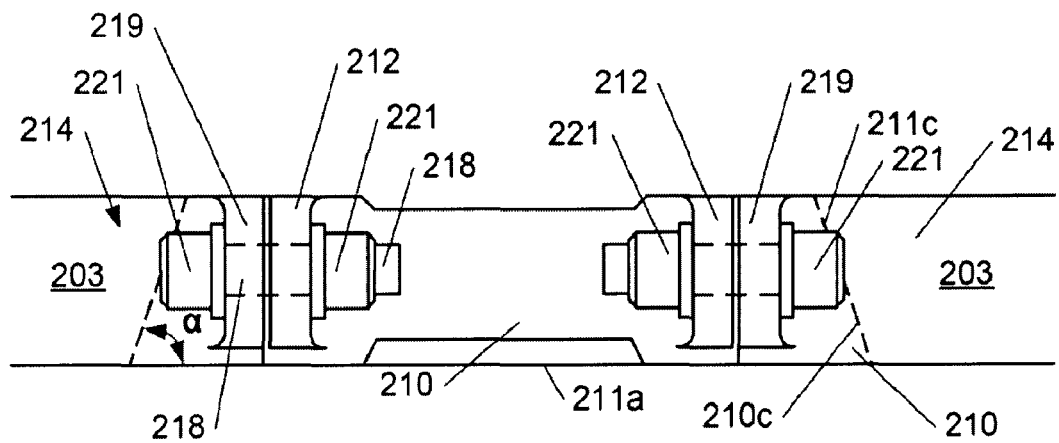
FIG. 3 is a profile view of flanges assembled by means of the connecting system according to this invention.

The first face 211a of the cavity 211 and the first face 210a of the latch 210 are complementary one to the other on at least part of their length. The second 211b and the third faces 211c of the cavity 211 extending from the first face 211a and form an angle α with the latter. The second face 210b and the third face 210c of the latch 210 are respectively provided so as to be in tight contact with the second face 211b and the third face 211c of the cavity 211 so as to ensure a radial retention of the assembly system and a circumferential retention of the assembled flanges 203, 204. It is advantageous that the angle α (FIG. 3) should be within a range varying from 15° to 90°, preferably from 30° to 60°.

Each latch 210 further comprises projections 212 provided with securing means 213. Advantageously, the latch 210 and the assembled flanges 203, 204 have an identical width and more particularly, at the level of the contact surface being the first face 210a, 211a of the latch 210 and the cavity 211. Flanges 203, 204 have advantageously a trapezoidal section and therefore, the latches 210 will comprise a substantially identical cross-section and will be, preferably, without however any limitation, solid bodies.

The connecting system also comprises at least one collar 214 having two side faces 215a,b provided for abutting against proximal faces 203p, 204p of both assembled flanges 203, 204. Securing means 216 complementary to said securing means 213 of the projections 212 are also provided.

When flanges 203, 204 are brought in contact with each other, for example, while cases are mounted together, each junction latch 210 is inserted into its corresponding cavity 211 formed by the assembled flanges 203, 204. Subsequently, the collar 214 is provided straddling flanges 203, 204 of both ferrules 201, 202, and securing members 213 of the latch 210 are engaged by securing means 216 of each collar 214. Securing means 216 provided on the projections 212 of the junction latch 210 comprise a hole 217 in which a stem 218 is inserted, more particularly a threaded stem. Securing means 216 of said collar also comprise projections 219 provided with holes 220, in which said threaded stem 218, whether already inserted or not into the hole 217 of projections 212 of the junction latch 210 is inserted. Subsequently, nuts 221 are screwed onto the threaded stem 218 being inserted in said hole 217 or 220 (see, for example, FIG. 3). Obviously, it is possible according to the invention that the threaded stem 218 be integral either with projections 212 of the latch 210, or with projections 219 of the collar 214 in order to reduce the number of nuts 221 to be used for the assembly. Similarly, other securing means could be contemplated in the present invention and are all considered as equivalent to those mentioned herein above.

Each collar 214 is therefore provided for partially overlapping each latch 210 when the securing means 213 of projections 212 of said latch 210 are connected with said securing means 216 of said collar 214. Such an overlapping of part of each latch 210 is however not essential.

Figure 4:
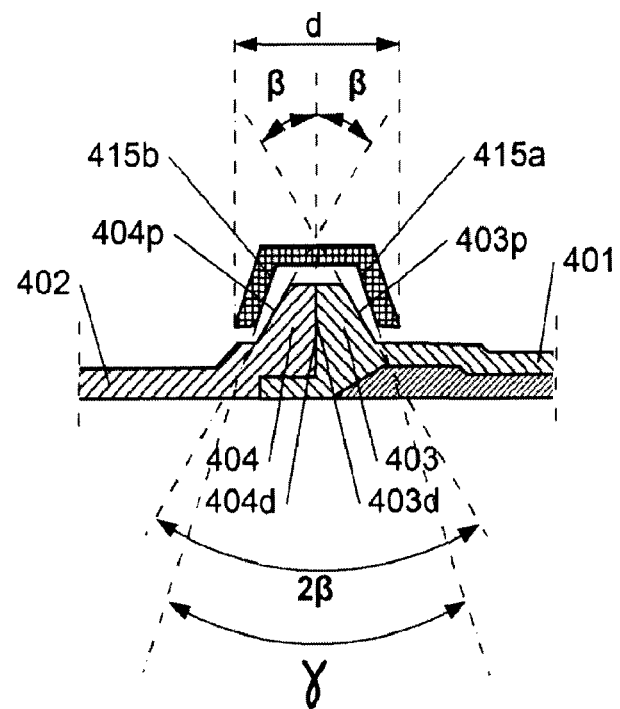
FIG. 4 is a cross-sectional view of the flanges assembled by the connecting system according to this invention.

As can be seen in FIG. 4, the proximal face 404p, 403p, and the distal face 404d, 403d of each of the flanges 403, 404 are tilted one with respect to the other by an angle β, the distal face 404d, 403d, of each flange 403, 404 being perpendicular to a longitudinal axis L of the ferrule 401, 402 (tubular member). The side faces 415a, 415b of said collar 414 are also tilted one with respect to the other by an angle γ lower than 2×β.

Flanks (proximal faces 404p, 403p) of the flanges 403, 404 (side faces) are therefore tapered so as to obtain an axial prestress ensuring an adequate transmission of efforts in the assembly. The angle γ being lower than 2×β, the collar 414 should be distorted for overlapping the assembled flanges 403, 404 and therefore, the memory of the material forming the collar 414 as well as the distortion force improve the contact between flanges 403, 404. This allows reducing the possibility of a loss of part of the prestress efforts that could result in flanges sliding and therefore, in the assembly integrity being damaged.

Thereby, measuring the prestress could be achieved through the measurement of the clamping torque for the screws, possibly completed by the measurement of the segment distortion (distance d in FIG. 4 in relation with angle γ).

The number of cavities being present in the assembled flanges of two tubular members is variable depending on the desired resistance of the assembly. Similarly, the number of latches and collars will be preferably equal to that of the number of cavities.

It is well understood that the present invention is in no way limited to the above described embodiments and that numerous changes could be brought to it without departing from the scope of the appended claims.

For example, according to an other embodiment, the junction latch and the collar are integrally made in one single part, which, although slightly more complex to be manufactured, allows for a better distribution of stresses.

According to another embodiment, the junction latch is made of two distinct, separated, parts, each respectively abutting on each of the second and third faces of the cavity.

According to still another embodiment, the collar projections are replaced by distinct securing means arranged on the collars.

The invention claimed is:

1. A system for connecting two substantially tubular members of an axial compressor case, comprising:
    two flanges, each being substantially annular and comprising a proximal face adapted to be integral with one of the two substantially tubular members and a distal face; and
    members for pressing the distal faces of both flanges one against the other, so as to be able to transmit tensile and compression axial stresses between both flanges assembled through clamping, wherein:
    said pressing members comprise at least one junction latch, provided for being arranged in at least one cavity formed by the two flanges upon assembly,
    each cavity and each junction latch includes an at least partially complementary shape,
    the at least one cavity is adapted to receive the at least one junction latch in sliding axial engagement,
    the at least one cavity extends axially through each of the two flanges, and
    each junction latch includes projections provided with securing means and at least one collar having two side faces arranged so as to abut on the proximal faces of both assembled flanges, and comprising securing means complementary to said projections of said at least one junction latch.

2. The connecting system according to claim 1, wherein said at least one junction latch comprises two distinct parts, each of the two distinct parts comprising at least one, of said projections provided with said securing means.

3. The connecting system according to claim 2, wherein the two distinct parts are separated.

4. The connecting system according to claim 2, wherein the two distinct parts include two of said projections provided with said securing means.

5. The connecting system according to claim 1, wherein each cavity and each junction latch each comprise a first, a second and a third face, said first face of each cavity and of each junction latch being substantially parallel to the circumference of each said flanges and mutually complementary, said second and third faces of each cavity extending from and forming a first angle with the first face of each cavity, the second face and the third face of each junction latch being respectively provided so as to be in tight contact with the second face and the third face of each cavity.

6. The connecting system according to claim 5, wherein the first angle is within a range varying from 15° to 90°.

7. The connecting system according to claim 6, wherein the first angle is within a range varying from 30° to 60°.

8. The connecting system according to claim 1, wherein each junction latch and the assembled flanges have an identical width.

9. The connecting system according to claim 1, wherein:
the proximal face and the distal face of each of both flanges are tilted one with respect to the other by a second angle, the distal face of each flange being perpendicular to a longitudinal axis of said tubular member,
side faces of said at least one collar are also tilted one with respect to the other by a third angle; and
the third angle is less than twice the second angle.

10. The connecting system according to claim 1, wherein said junction latch is a solid prism with a trapezoidal section.

11. The connecting system according to claim 1, wherein the securing means of the projections of said junction latch comprise a hole in which a stem is inserted.

12. The connecting system according to claim 11, wherein:
the stem is a threaded stem, and
securing means complementary to said collar also comprise projections provided with holes in which the threaded stem is inserted.

13. The connecting system according to claim 1, wherein said collar is provided so as to partially overlap said junction latch when securing means of projections of said junction latch are connected with said securing means of said collar.

14. An axial compressor case comprising a plurality of ferrules, at least two of which are adjacent and connected by means of a connecting system according to claim 1.

15. An axial compressor case according to claim 14, wherein at least one of said two adjacent ferrules comprises a stator and/or an abradable inner surface.

16. The axial compressor case according to claim 14, wherein the axial compressor case is for a low pressure compressor of a turbojet or a turboprop.

17. The connecting system according to claim 1, wherein an axial profile of each proximal face of the two flanges monotonically converges toward its corresponding distal face from an outer diameter of the substantially tubular members to an outer diameter of the flanges.

18. The connecting system according to claim 1, wherein:
the two side faces of the at least one collar consist of a first side face and a second side face, and
an axial profile of the first side face monotonically converges toward the second side face from an inner radial edge of the at least one collar to an outer radial edge of the at least one collar, the inner radial edge disposed at a shorter radial distance from an axis of the tubular member than the outer radial edge.

19. A method for connecting at least two adjacent ferrules of an axial compressor case, comprising:
connecting the at least two adjacent ferrules using a connecting system according to claim 1.

20. The method according to claim 19, wherein at least one of said two adjacent ferrules comprises a stator and/or an abradable inner surface.

* * * * *

UNITED STATES PATENT AND TRADEMARK OFFICE
CERTIFICATE OF CORRECTION

PATENT NO. : 8,210,809 B2
APPLICATION NO. : 11/964184
DATED : July 3, 2012
INVENTOR(S) : Pierre Joseph Marie Christophe Delobel et al.

Page 1 of 1

It is certified that error appears in the above-identified patent and that said Letters Patent is hereby corrected as shown below:

On the title page, Item (30), the Foreign Application Priority Data is incorrect. Item (30) should read:

-- (30)       Foreign Application Priority Data

Dec. 27, 2006   (EP) .............................. 06 127256 --

Signed and Sealed this
Twenty-eighth Day of August, 2012

David J. Kappos
*Director of the United States Patent and Trademark Office*